July 3, 1928.  1,675,460
H. NYQUIST
DISTORTION COMPENSATOR
Filed Nov. 20, 1924  4 Sheets-Sheet 1

INVENTOR
H. Nyquist
BY
ATTORNEY

July 3, 1928.  
H. NYQUIST  
1,675,460  
DISTORTION COMPENSATOR  
Filed Nov. 20, 1924  
4 Sheets-Sheet 3

INVENTOR  
H. Nyquist  
BY  
ATTORNEY

Patented July 3, 1928.

1,675,460

UNITED STATES PATENT OFFICE.

HARRY NYQUIST, OF MILLBURN, NEW JERSEY, ASSIGNOR TO AMERICAN TELEPHONE AND TELEGRAPH COMPANY, A CORPORATION OF NEW YORK.

DISTORTION COMPENSATOR.

Application filed November 20, 1924. Serial No. 751,146.

An object of my invention is to provide a new and improved electrical transmission system in which the frequency components of the current within a certain desired frequency range will be in the same phase relation with one another at the receiving end as at the transmitting end. Another object of my invention is to make the received composite wave form in such a system of the same shape as the transmitted wave form. Another object is to provide for a desired displacement in time of the respective frequency components of a composite alternating current. Another object is to provide for a suitable phase shift of currents of different frequencies in a circuit so as to bring them into a desired phase relation. Another object is to provide for a relative phase shift of the frequency components in the output from a transmission line to compensate for the phase shift on the line and to restore the components at the receiving end of the line to the same phase relation as at the sending end. Another object is to provide a transducer at the receiving end of a transmission line that shall compensate the distortion due to differential phase shift on the line. Still another object is to provide a transducer to compensate for distortion due to a greater phase shift at high and low frequencies than at an intermediate frequency. In the following specification with the accompanying drawings I disclose a specific example of practice according to my invention. It will be understood that the specification relates largely to this particular case and that the invention is defined in the appended claims.

By the term "transducer," as employed in this specification, I mean any apparatus having a pair of input terminals for applied electromotive force and a pair of output terminals by which electromotive force may be applied therefrom, the output being a function of the input.

Figure 1:
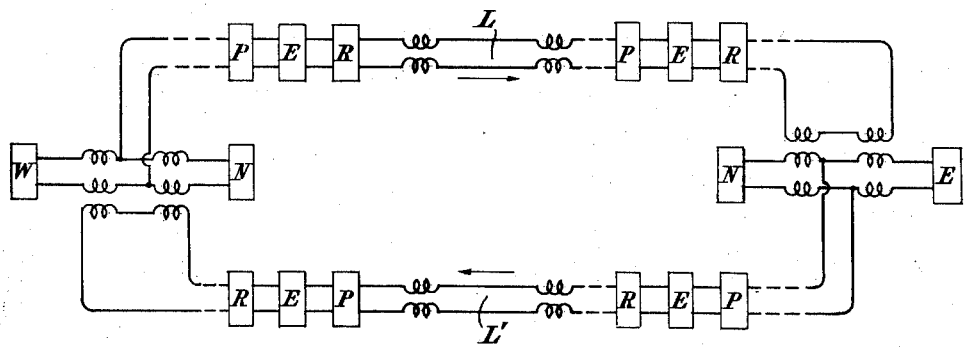
Figure 2:
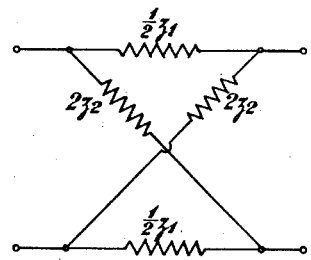
Figure 3:
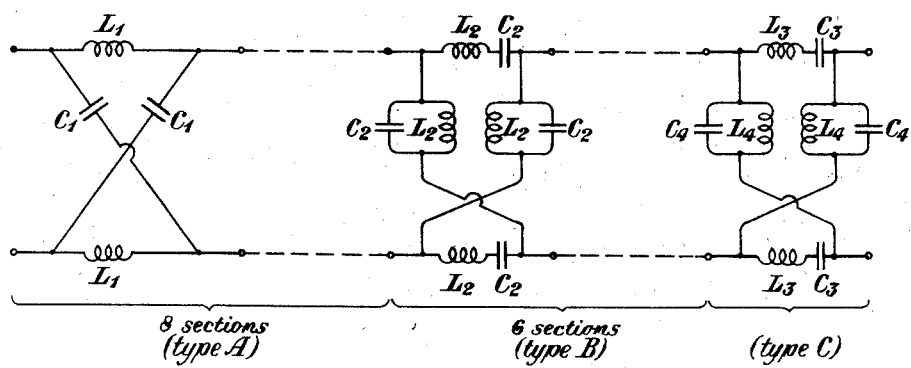
Figure 4:
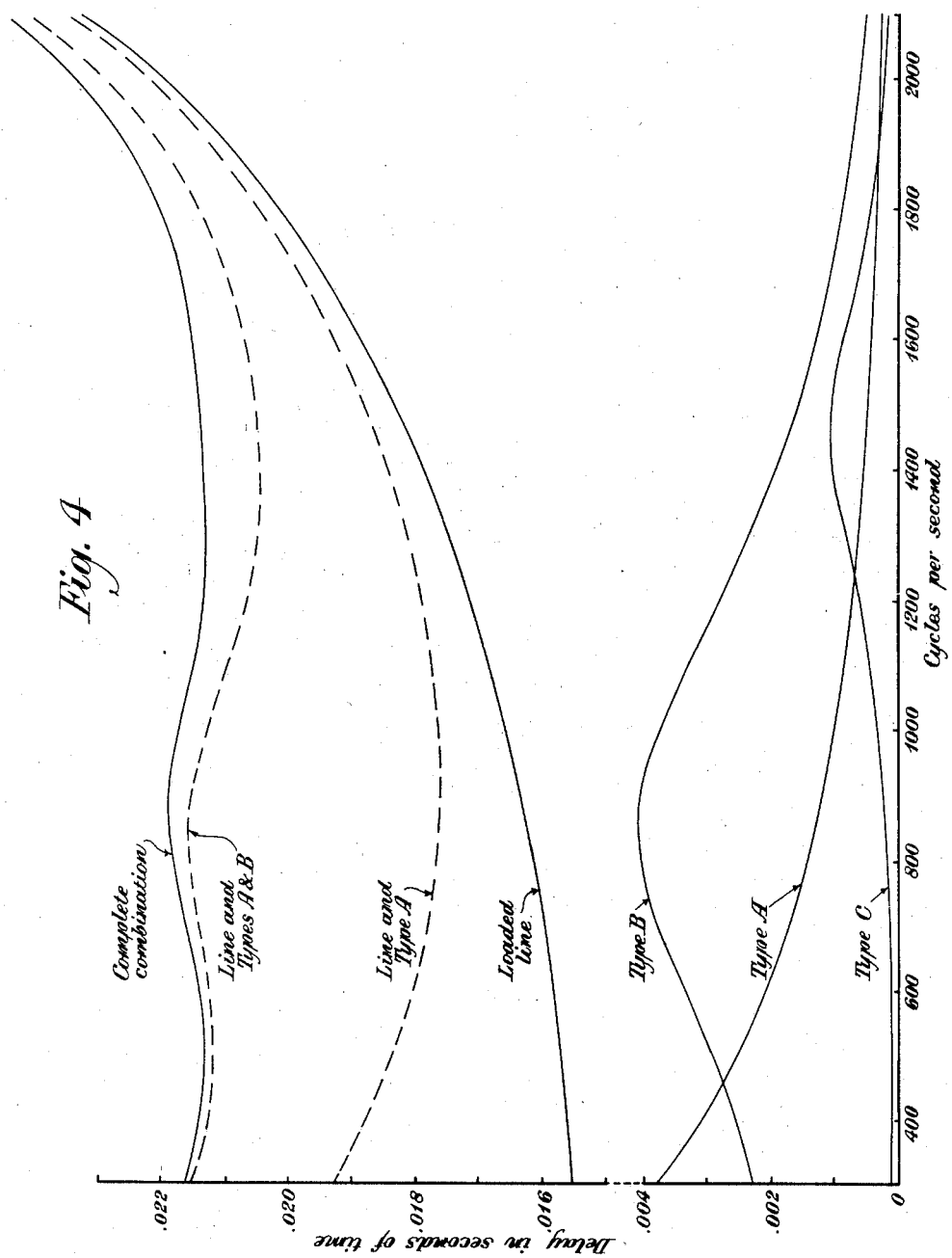
Figure 5:
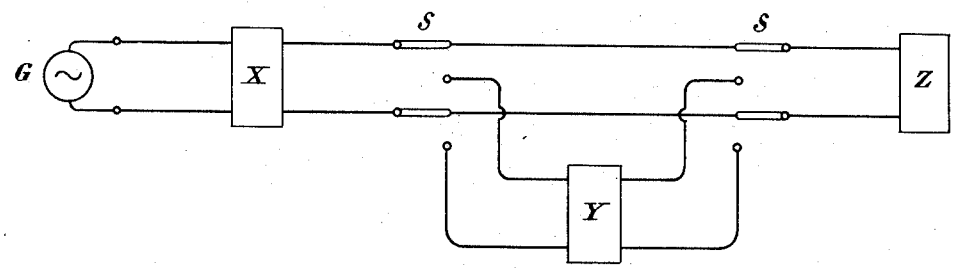
Figure 6:
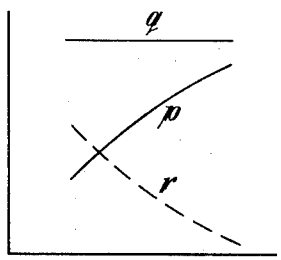
Figure 7:
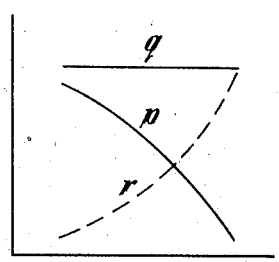
Figure 8:
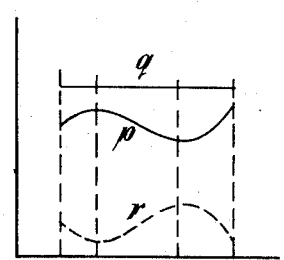
Figure 9:
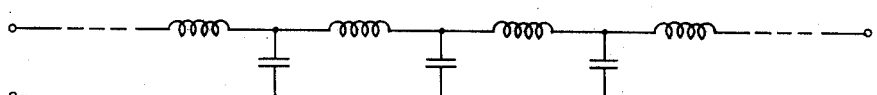
Figure 10:
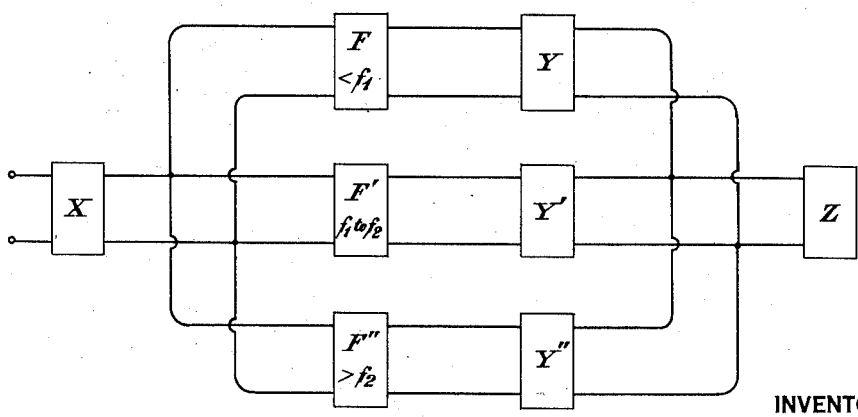
Figure 11:
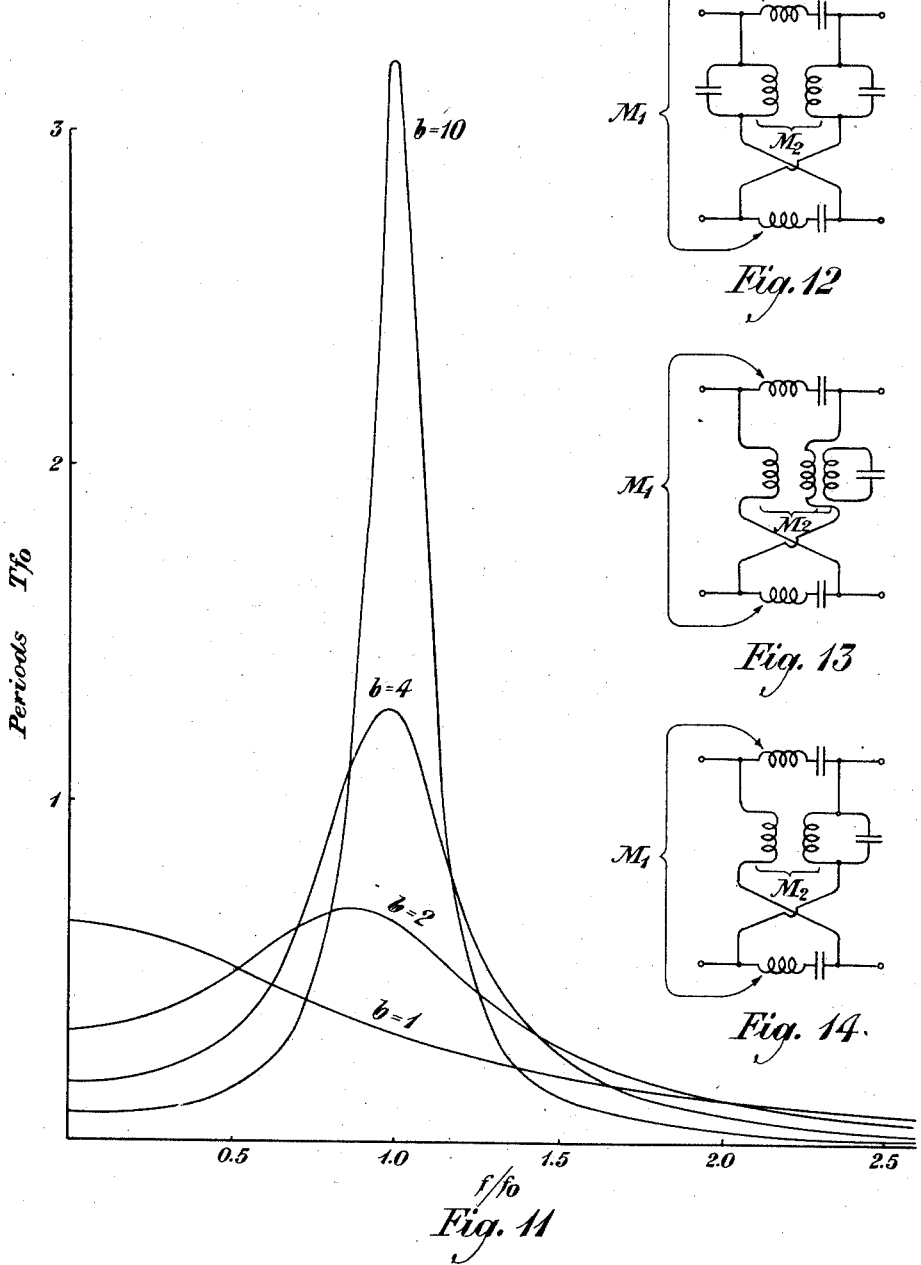
Figure 12:
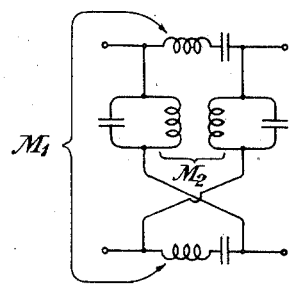
Figure 13:
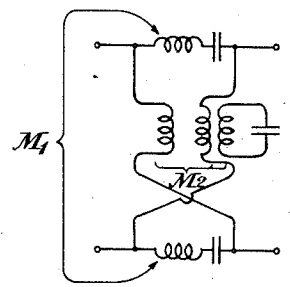
Figure 14:
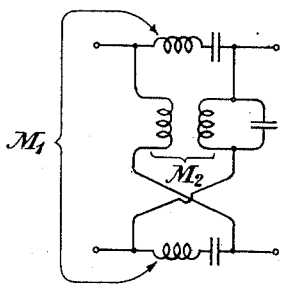

Referring to the drawings, Figure 1 is a symbolic diagram of a four-wire transmission system embodying my invention. Fig. 2 is a diagram of a general network of which special forms may be employed in embodying my invention. Fig. 3 is a diagram of a particular network used in an embodiment of my invention here disclosed by way of illustration. Fig. 4 is a diagram of delay-frequency characteristics to which reference will be made in explaining the principle of my invention, and the procedure for embodying it in a particular case. Fig. 5 is a diagram showing the relation of my improved delay network to other elements of the system. Figs. 6, 7 and 8 show different kinds of delay-frequency characteristics. Fig. 9 shows a suitable network for the case of Fig. 7. Fig. 10 shows an arrangement suitable for the case of Fig. 8. Fig. 11 gives a family of delay-frequency characteristics that may afford guidance in the design of a suitable network in a particular case, and Figs. 12, 13 and 14 illustrate structural modifications of the network sections by which there is economy in the use of coils and condensers.

The stations W and E of Fig. 1 are connected in a four-wire system by the two loaded lines L and L' in each of which occasional repeaters R are interposed. On the input side of each repeater R there are interposed a network P and an attenuation equalizer E intended to correct for distortion due to differential phase shift and attenuation on the line. Voice frequency currents put on the line L at station W go to the first repeater station, and then they pass through the phase distortion equalizer P which compensates for the differential retardation of the components of the various frequencies by further retarding them unequally so that they are brought to the same time relation to each other as at the sending end. Then the currents pass through the attenuation equalizer E and then through the amplifier R, and so on at each repeater station.

I will first assign specific values for the constants of a certain line and will give the specific design for the network of my invention in this instance, and thereafter I will discuss the principles on which this design is based.

The line chosen for this example is taken as a one-way No. 19 gauge loaded cable circuit, 154 miles long, with a repeater at the middle and at the receiving end and with a phase compensating network at the receiving end. The constants of the line are:

Resistance $R_0 = 95.5$ ohms per mile
Inductance $L_0 = 0.154$ henry per mile
Capacity $C_0 = 0.065$ microfarad per mile
Interval between loads $= 1.136$ miles.

Assume that a wave train of a certain pure frequency $f$ is applied suddenly at one end of this line. As is well known, the received current at the other end will build up somewhat gradually. Let the time from the instant the sending current is applied until the received current reaches one-half its full steady state value be represented by the letter T. This time T as a function of frequency $f$ is shown by the curve marked "Loaded line" in Fig. 4. It will be seen that the delay is greater for the higher frequencies of the essential voice range.

The appropriate phase equalizing network of Fig. 3 consists of sections of three different types, eight sections of Type A, six sections of Type B, and one section of Type C. All these sections are special cases of the general crossed or lattice network of Fig. 2. The respective inductances and capacities in the network of Fig. 3 have the values given in the following table:

$L_1 = 0.5$ henry
$C_1 = 0.2$ microfarad
$L_2 = 0.25$ henry
$C_2 = 0.1$ microfarad
$L_3 = 0.42$ henry
$L_4 = 0.059$ henry
$C_3 = 0.024$ microfarad
$C_4 = 0.17$ microfarad.

The eight sections of Type A by themselves have a delay-frequency characteristic as shown by the curve marked "Type A" in Fig. 4. In series with the line the resultant characteristic is shown by the dotted curve marked "Line and Type A".

It will be seen that the characteristic for the loaded line alone slopes up to the right and is concave up, and the characteristic for the Type A network slopes down to the right and is concave up, and the resultant characteristic shown in dotted lines has an intermediate minimum. The additional sections of Type B and Type C are designed so that, by themselves, they give intermediate maxima, as shown in Fig. 4, and the entire combination gives an approximately horizontal characteristic curve as designated "Combination" in Fig. 4. This means that for all the frequency components within the essential voice range the delay in transmission is approximately the same, that is, between about 0.021 and 0.022 second of time.

Referring to Fig. 5, let X be any transducer between the source G and the receiver Z. The delay-frequency characteristic of the transducer X over a certain frequency range will have a certain form, for example, as shown by the curve $p$ in Figs. 6, 7 or 8. Suppose it is desired that the currents shall go to receiver Z with their components of different frequency in the same time relation as at the generator G, in other words so that the components are all delayed equally and at the receiver the delay-frequency curve is a horizontal line such as $q$. This effect will be obtained by interposing a compensator whose characteristic $r$ is complementary to $p$ as shown in the drawings.

If the characteristic of the transducer X slopes up to the right as at $p$ in Fig. 6, then the compensator Y should have a characteristic sloping down to the right as at $r$. Sections of crossed type network, such as those of Type A in Fig. 3 answer to this requirement, as will be seen by comparing curve $r$ in Fig. 6 with the curve for Type A in Fig. 4.

If the characteristic of the transducer X slopes down to the right as at $p$ in Fig. 7, then the compensator Y should have a characteristic sloping up to the right as at $r$. Such a characteristic as $r$ is given by a recurrent network of the type shown in Fig. 9 with series inductances and shunt capacities.

One way to deal with a case like that of Fig. 8 is to separate the characteristic $p$ into elements respectively sloping up or down and put filters F, F′ and F″ in multiple as in Fig. 10 with critical frequencies $f_1$ and $f_2$ as shown on Fig. 8 and Fig. 10. Thus F is a low pass filter, F′ is a band pass filter, and F″ is a high pass filter. Then for each restricted frequency range passed by a filter, a respective compensator Y, Y′ or Y″ is provided, these being of either type mentioned heretofore in connection with Figs. 6 and 7, and the partial frequency ranges from the outputs of these compensators are assembled at the input of the receiver Z.

For a series of network sections like the one shown generally in Fig. 2, and with the impedance values indicated thereon, the propagation constant Γ and the characteristic impedance K are given by the following formulas:

$$\cosh \Gamma = 1 + \frac{2z_1}{4z_2 - z_1} \quad (1)$$

$$K = \sqrt{z_1 z_2}. \quad (2)$$

It is desirable that the characteristic impedance shall be a real constant K, and approximately the same as the impedance (resistance) of the elements with which the network is connected on the input and output sides. Assuming that the impedances $z_1$ and $z_2$ are dissipationless, that is made up only of reactance elements, this result is secured by making $$z_1 = Kz \text{ and } z_2 = \frac{K}{z} \quad (3)$$

where $z$ is a pure reactance. Substituting in 1, it follows that:

$$\cosh \Gamma = 1 + \frac{2z}{\frac{4}{z} - z} \quad (4)$$

A familiar formula of hyperbolic trigonometry is $$\tanh \frac{\Gamma}{2} = \sqrt{\frac{\cosh \Gamma - 1}{\cosh \Gamma + 1}} \quad (5)$$

Substituting from 4, this reduces to $$\tanh \frac{\Gamma}{2} = \frac{z}{2} \quad (6)$$

In general the propagation constant $\Gamma$ may be put equal to $\alpha + i\beta$ where $\alpha$ is the attenuation constant and $\beta$ is the phase shift constant. The structure for $z$ is of reactance elements only and on this basis it follows from Equation (6) that $\alpha = 0$ and that $$i \tan \frac{\beta}{2} = \frac{z}{2} \quad (7)$$

For the sections of Type A of Fig. 3, this gives $$\beta = 2 \tan^{-1} \frac{wL_1}{2K} \quad (8)$$

It is approximately true that $$T = d\beta/dw \quad (9)$$

Hence by differentiating (8) the result is obtained that $$T = \frac{4K}{4K^2 + w^2 L_1^2} \quad (10)$$

By the aid of this equation, delay-frequency characteristics can be drawn for respective values of $L_1$, and from them it can readily be determined what is the best value of $L_1$ and how many network sections are necessary to get such compensation as should be effective for the Type A sections. In this way, the number of sections for Fig. 3 has been fixed at eight and the value of $L_1$ and the dependent value of $C_1$ have been determined as stated heretofore.

For the sections of Type B, let the impedance $z$ be made up of a series resonant circuit so that $$\frac{z}{2} = iw \frac{b}{2w_0} + \frac{bw_0}{i2w} \quad (11)$$

Where $w = 2\pi f$, $f$ being the frequency, and $b$ and $w_0$ are parameters to which we may assign proper values, $w_0/2\pi$ being the resonance frequency, and $$b = \frac{2}{K} \sqrt{L_2/C_2} \cdot$$

The truth of Equation (11) will become apparent on noticing that $$w_0 = 1/\sqrt{L_2 C_2},$$

and substituting for $L_2$ and $C_2$ in terms of $b$ and $w_0$ in the Equation $$z_1/2 = i\, w\, L_2 + 1/i\, w\, C_2.$$

In cases where the inductances of the series and shunt elements are unequal, the values $L_2$ and $C_2$ refer to the series element only.

As before, with $\Gamma = \alpha + i\beta$, from Equations (6) and (11) it follows that $$\tanh \frac{\Gamma}{2} = \tanh \frac{i\beta}{2} = \frac{ib}{2}\left(\frac{w}{w_0} - \frac{w_0}{w}\right) \quad (12)$$

whence $$\beta = 2 \tan^{-1} \frac{b}{2}\left(\frac{w}{w_0} - \frac{w_0}{w}\right) \quad (13)$$

Differentiating (13) and substituting in (9)

$$T = \frac{\frac{b}{w_0}\left(1 + \frac{w_0^2}{w^2}\right)}{1 + \frac{b^2}{4}\left(\frac{w}{w_0} - \frac{w_0}{w}\right)^2} \quad (14)$$

As $w$ increases from zero to infinity, the numerator decreases always, but the denominator passes through a minimum at $w = w_0$. If $b$ is made sufficiently large, the fraction in (14) has a maximum near $w_0$. This is shown in Fig. 11, which also shows that by giving to $b$ increasing values, T can be made to increase at its maximum with accompanying decrease of values away from its maximum the area of the curve remaining constant. By increasing the number of sections of the network T can be increased over the whole range for $w$. Furthermore, $w_0$ may be chosen to put the maximum point at the right or left as may be desired.

Referring to Fig. 4, it is seen that after the compensation effected by Type A, this gives a minimum at or near 800 cycles, or $w_0 = 2\pi 800$. In Fig. 11 a series of curves is constructed with coordinates $f/f_0$ and $T.f_0$ instead of coordinates $f$ and $T$ as in Fig. 4. This is somewhat more convenient, and the curves of Fig. 11 can be utilized for any value of $w_0$. Plotted either way, the area of each curve for a single section is unity. Hence we can estimate from the diagrams what value of $b$ will be best and how many sections will be needful. In this way, the value $b = 2$ is chosen and six sections of Type B are found to be appropriate. Having chosen respective values for $K$, $w_0$ and $b$, it follows from (3) and (11) that $$\frac{z}{2} = \frac{zK}{2} = iw\frac{bK}{2w_0} + \frac{bw_0 K}{i2w}$$

and using the lettering of Fig. 3.

$$\text{series } L_2 = \frac{bK}{2w_0} = \frac{K}{w_0}$$

and $$\text{series } C_2 = \frac{2}{bw_0 K} = \frac{1}{w_0 K}$$

Also $$2z_2 = \frac{2K}{z} = \frac{1}{iw\frac{b}{2Kw_0} + \frac{bw_0}{i2wK}}$$

and shunt $$C_2 = \frac{b}{2Kw_0} = \frac{1}{Kw_0}$$

and shunt $$L_2 = \frac{2K}{bw_0} = \frac{K}{w_0}$$

It will be noticed that the value $b=2$ enables us to use inductances and capacities of the same values in the series and shunt combinations; this is the case for Type B.

The dotted curve in Fig. 4 marked "Line and Types A and B" gives the delay-frequency characteristic for the corresponding combination. This shows a dip at about 1400 cycles, and by the principles and methods already explained, the design is determined for another section designated Type C and this gives the resultant characteristic as shown in Fig. 4.

It will be seen that the network sections like Types B or C may be employed to compensate a wavy characteristic like that of Fig. 8, thus offering an alternative procedure instead of the use of the filters as in Fig. 10.

It has already been mentioned that each section of Type B or Type C contributes about a unit area to the curves of Figs. 4 or 11. Each Type A section contributes only about half a unit, but this is not necessarily to be looked on as a disadvantage, for the Type A sections have only half as many reactance elements as the others.

The general procedure is first to plot the delay-frequency characteristic of the transducer to be compensated as in the case of the curve marked "Loaded line" in Fig. 4. Then add sections like Type A in proper number and with properly chosen reactance values so as to bring the ends of the characteristic up somewhere nearly to the same level. Then add sections like Type B or C to raise the minimum dips in the curve up to nearly the level of the ends, and make the curve have nearly the same altitude all across the essential frequency range as for the uppermost curve of Fig. 4.

In the construction of network sections, like Type B or Type C, it is easily possible to reduce the number of coil turns or the number of condensers, or both, as shown in Figs. 12, 13 and 14, compared with one another and with Fig. 4. In Fig. 12, the series inductance coils are shown with mutual inductance, and the shunt inductance coils are shown with mutual inductance, so that the total number of turns is made substantially less than if these coils were all separate. In Fig. 13, the two shunt condensers are replaced by a single condenser in an inductively related circuit, and in Fig. 14 the single condenser is in a single shunt, which is practicable because of the mutually inductive relation of the two coils.

Referring again to the fact that each section of Type B or Type C contributes about a unit of area to the resultant curve of Fig. 4 or Fig. 11 (and half a unit for each section of Type A), it will readily be seen that this affords a guide as to the number of section that may need to be employed. Having given the "loaded line" curve of Fig. 4, an ideal characteristic can be drawn higher up and the area between the two characteristics will give the number of sections of network that must be employed. The shorter the frequency range is made the less the number of sections that will be required, but shortening the frequency range may impair the quality in one way while the addition of phase correcting network sections improves it in another way. Assuming that economy of apparatus, particularly network sections, is a desideratum, then it may be said that without unduly shortening the frequency range a resultant characteristic can be obtained which may be allowed to depart a little from the horizontal, and will require no more network sections than would be required to get a fully horizontal characteristic for a less frequency range. In other words, starting with a characteristic like that marked "Loaded line", the optimum characteristic with proper economy of network sections will be a characteristic which extends over the whole desired frequency range but which slopes up a little at the right and thus requires a less number of network sections than would be necessary to attain a completely horizontal characteristic over the same frequency range.

I claim:

1. In combination, a transducer giving different relays for different frequencies over a certain frequency range, and a compensator to equalize the delays consisting of sections, at least one of these sections giving a maximum of delay within said frequency range.

2. In combination, a transducer giving different delays for different frequencies over a certain frequency range, and a compensator to equalize the delays consisting of section of different type, at least one section giving the greatest delay at one end of said frequency range and at least one other section giving a maximum of delay at an intermediate frequency.

3. In combination, a loaded line, and a phase compensator to equalize delays due to the loaded line consisting of sections some of which compensate most for the lower frequencies of the essential voice frequency range and others of which give a maximum of compensation at an intermediate frequency.

4. In combination, a loaded line, and a phase compensator to equalize delays due to the loaded line consisting of sections of lattice type network, some of the sections each having inductance and capacity in series in each of a pair of opposite branches, and inductance and capacity in parallel in each of the other pair of opposite branches.

5. In combination, a transducer whose delay-frequency characteristic over a certain frequency range has an intermediate minimum, and a network whose delay-frequency characteristic has an intermediate maximum.

6. In combination a transducer whose delay-frequency characteristic over a certain frequency range has an intermediate minimum, and a compensator having at least one section of lattice type network whose delay frequency characteristic has an intermediate maximum.

7. The method of compensating for differential delay of different frequencies of a composite alternating current which consists in further delaying the composite current with maxima of delay at several different frequencies.

8. As a delay compensator for a composite alternating current, a section of lattice type network with series inductance and capacity in each of two opposite arms and with shunt inductance and capacity in each of the other two opposite arms.

9. As a delay compensator for a composite alternating current, a section of lattice type network with series inductance and capacity in each of two opposite arms and with shunt inductance and capacity in each of the other two opposite arms, the resonant frequency of said series combination and the anti-resonant freqency of said shunt combination being the same.

10. The method of compensating phase distortion in a composite current over a certain frequency range, which consists in delaying the current with delay at maxima within said range whereby the delay is equalized over the entire range.

11. In combination, in a sectional delay compensator, a section of lattice type network with inductances only in one pair of opposite branches and capacities only in the other pair, and a section of lattice type network with series inductance and capacity in each of a pair of opposite branches and with shunt inductance and capacity in each of the other pair of opposite branches.

12. In a delay compensator for a certain frequency range, a network section giving a maximum of delay at an intermediate frequency relatively to said frequency range.

13. The method of compensating for different delay of different frequencies in a composite alternating current for which the delay-frequency characteristic is sloping and curved, which consists in further delaying the current according to a characterstic of opposite slope and opposite curvature.

14. The method of compensating for different delay of different frequencies in a composite alternating current for which the delay-frequency characteristic shows an intermediate minimum of delay, which consists in further delaying the current according to a characteristic having a corresponding maximum of delay.

In testimony whereof, I have signed my name to this specification this 7th day of November 1924.

HARRY NYQUIST.